United States Patent [19]

Carroll et al.

[11] Patent Number: 5,468,695
[45] Date of Patent: Nov. 21, 1995

[54] LEAD-FREE THICK FILM PASTE COMPOSITION

[75] Inventors: Alan F. Carroll, Raleigh, N.C.;
Kenneth W. Hang, West Chester, Pa.

[73] Assignee: E. I. Du Pont de Nemours and Company, Wilmington, Del.

[21] Appl. No.: 329,812

[22] Filed: Oct. 27, 1994

Related U.S. Application Data

[62] Division of Ser. No. 99,027, Jul. 29, 1993, Pat. No. 5,378,408.

[51] Int. Cl.$^6$ .......................... C04B 3/064; C04B 3/066; C03C 3/066; C03C 8/04
[52] U.S. Cl. .......................... 501/79; 501/26
[58] Field of Search .......................... 501/21, 73, 77, 501/79, 53, 26

[56] References Cited

U.S. PATENT DOCUMENTS

| | | | |
|---|---|---|---|
| 2,642,633 | 6/1953 | Dalton | 20/56.5 |
| 2,942,992 | 6/1960 | Dumesnil | 106/48 |
| 3,113,878 | 12/1963 | Martin | 106/54 |
| 3,258,350 | 6/1966 | Martin | 106/47 |
| 3,404,027 | 10/1968 | Koslorek | 117/124 |
| 3,873,330 | 3/1975 | Sherk et al. | 106/47 |
| 4,376,169 | 3/1983 | Eppler | 501/24 |
| 4,446,241 | 5/1984 | Francel et al. | 501/14 |
| 4,537,862 | 8/1985 | Francel et al. | 501/14 |
| 4,554,258 | 11/1985 | Francel | 501/21 |
| 4,814,298 | 3/1989 | Nelson et al. | 501/17 |
| 4,892,847 | 1/1990 | Reinherz | 501/14 |
| 4,940,677 | 7/1990 | Beall et al. | 501/45 |
| 4,959,330 | 9/1990 | Donohue et al. | 501/8 |
| 5,114,884 | 5/1992 | Lapp et al. | 501/41 |
| 5,122,484 | 6/1992 | Beall et al. | 501/46 |
| 5,252,521 | 10/1993 | Roberts | 501/17 |
| 5,378,408 | 3/1995 | Carroll et al. | 252/514 |

FOREIGN PATENT DOCUMENTS

| | | |
|---|---|---|
| 0443842A1 | 8/1991 | European Pat. Off. . |
| 775061 | 10/1980 | U.S.S.R. . |
| 923976 | 4/1982 | U.S.S.R. . |
| 1477706 | 5/1989 | U.S.S.R. . |
| 2104058 | 3/1983 | United Kingdom . |

*Primary Examiner*—Deborah Jones

[57] ABSTRACT

A screen-printable thick film paste composition suitable for forming conductive patterns on a rigid substrate comprising:

(a) finely divided particles of a lead-free glass composition having a softening point log (eta)=7.6 poise from 400° C.–650° C., a log (eta) specific viscosity in a range from 2 at 500° C. to 5 at 700° C. and consisting essentially of, by weight 65–95% $Bi_2O_3$, 2–15% $SiO_2$, 0.1–9% $B_2O_3$, 0–5% $Al_2O_3$, 0–5% CaO, and 0–20% ZnO; and (b) electrically conductive particles; and all of (a) and (b) being dispersed in (c) an organic medium.

1 Claim, No Drawings

LEAD-FREE THICK FILM PASTE COMPOSITION

This is a division of application Ser. No. 08/099,027, filed Jul. 29, 1993 now U.S. Pat. No. 5,378,408.

FIELD OF THE INVENTION

The invention is directed to thick film paste compositions for heated window applications such as automotive backlight defoggers and particularly to such compositions which use a lead-free glass frit as a binder.

BACKGROUND OF THE INVENTION

Conventional approaches to compounding frits which are simultaneously low-melting, moderate in expansion and durability and that provide desirable wetting characteristics have included use of lead borosilicate systems (such as those disclosed in U.S. Pat. Nos. 3,258,350, 2,642,633 and 3,404,027) or of lead zinc borosilicate systems (such as those disclosed in U.S. Pat. Nos. 3,873,330 and 3,258,350). However, these lead borosilicate systems have highly toxic lead oxide as their major constituent. This toxic lead oxide must be carefully handled during processing to avoid ingestion or inhalation. Increasing durability of these lead-based systems to prevent acid leaching of the lead component by addition of silica, for example, results in an increased softening temperature.

Nontoxic, lead-free frit systems which are low melting, moderate in expansion and durability that provide excellent wetting are not, however, known in the art. Some alkali borosilicate glasses are adequately low-melting and exhibit good wetting, but they are not durable, and they exhibit very high expansion. Other alkali borosilicates such as those sold under the trademarks Pyrex (Corning Glass Works) and Kimax (Owens-Illinois, Inc.) are durable, low expansion glasses, but they exhibit high melting properties. Blending or use of an admixture of such borosilicates does not, however, yield a frit having the desired low-melting, moderate expansion and moderate durability characteristics. Zinc borosilicates such as those disclosed in U.S. Pat. No. 3,113,878 may provide moderate durability and moderate expansion characteristics: however, such systems do not produce satisfactory, low-melting frits. Alkali phosphate glasses or arsenic-selenium-tellurium-antimony glasses provide adequate low-melting properties, but they exhibit such poor durability that they are soluble in water at moderate temperatures. While the durability of alkali fluorophosphate glasses is significantly improved, these low melting glasses have poor wetting characteristics.

Chemically-resistant, lead-free glass frits based on $SiO_2$-$Bi_2O_3$-$B_2O_3$ chemistry have been disclosed by Francel in U.S. Pat. No. 4,554,258 and by Reinherz in U.S. Pat. No. 4,892,847 for decorative enamels and glazes. Francel teaches $SiO_2$-$Bi_2O_3$-$B_2O_3$ compositions containing by weight 29 to 38% $SiO_2$, 48 to 57% $Bi_2O_3$, 3 to 8% $B_2O_3$, about 2 to 8% alkali metal oxide and up to 9% alkaline earth oxide. Reinherz further teaches $SiO_2$-$Bi_2O_3$-$B_2O_3$ frits containing by weight 25 to 35% $SiO_2$, 25 to 45% $Bi_2O_3$, and 10 to 25% $B_2O_3$ modified by the addition of 4 to 19% alkali metal oxide and 0.3 to 8% of $ZrO_2$+$TiO_2$. These glass compositions differ from binders used in the present invention in that the prior art compositions contain significantly higher levels of silica and lower levels of bismuth oxide, thus do not provide the proper combination of excellent wetting and flow required for highly filled conductor compositions.

Dumesnil et al. in U.S. Pat. No. 2,942,992 teach the use of 5 to 50% alkali metal bismuth-borosilicate frit in combination with 95% to 50% bismuth trioxide as the binder for silver particles to form solderable silver compositions having good adhesion to high $TiO_2$ dielectric capacitor bodies. These glass frits consist essentially of 2 to 10% alkali metal oxide, 9 to 32% $SiO_2$, 35 to 75% $Bi_2O_3$, 5 to 15% $B_2O_3$, and 0 to 35% cadmium oxide by weight. Dumesnil stresses that the alkali metal oxide is essential to the frit in order to obtain a commercially workable binder system. The bismuth borosilicate frits disclosed In the prior art require the use of alkali metal oxide as a modifier, while the desired performance criteria of solderable conductors in the present invention are obtained through the excellent wetting properties of preferred bismuth borosilicate frit compositions modified with CaO, ZnO, and $Al_2O_3$.

Consistent with efforts to reduce or eliminate lead and cadmium from broad categories of products containing glass frits, the present invention deals with a lead-free glass frit that has been shown to be useful in the formulation of electrically conductive materials for heated window applications including automotive backlight rear window defoggers. In addition to providing an alternative chemistry to the lead-based frits of the prior art, the frit component of a heated window conductor composition must exhibit several important properties such as:

1) providing the appropriate viscosity and wetting of the substrate when fired to form a bond between the conductor and the glass substrate;

2) providing the appropriate viscosity and wetting of the metal powder during firing to enable sintering of the powder to form a dense conductor which exhibits excellent solder wettability;

3) minimizing the residual stress state between the conductor composition and the glass substrate, thus lowering sensitivity of the composite structure to temperature cycling.

The heated window conductor composition of the present invention achieves all of the above-stated advantages without the use of a lead-based frit binder. Preferred compositions of the lead-free frit component have been identified which, in addition, impart improved chemical durability in aqueous acetic acid. Furthermore, the excellent wetting characteristics of the lead-free frit component make it ideal for blending with durable frits of alternative lead-free chemistries including those with inferior wetting behavior to yield conductor compositions which exhibit outstanding performance properties and broad process latitude. Conductor compositions using these frit blends can be processed over a wide range of firing temperatures throughout which acceptable adhesion is consistently obtained and enhanced durability to acetic acid is exhibited.

SUMMARY OF INVENTION

In its primary aspect, the invention is directed to a screen printable thick film paste composition suitable for forming conductive patterns, on a rigid substrate comprising:

(a) finely divided particles of a lead-free glass composition having a softening point log (eta)=7.6 from 400° C.–650° C., a log (eta) specific viscosity in a range from 2 at 500° C. to 5 at 700° C. and consisting essentially of, by weight 65–95% $Bi_2O_3$, 2–15% $SiO_2$, 0.1–9% $B_2O_3$, 0–5% $Al_2O_3$, 0–5% CaO, and 0–20% ZnO; and (b) electrically conductive particles; and all of (a) and (b) being dispersed in (c) an organic medium.

In a secondary aspect, the invention is directed to the utilization of solderable conductive paste containing lead-free glass compositions on a rigid substrate such as automobile backlights, i.e., rear defogger windows.

In a still further aspect, the invention is directed to a lead-free glass composition.

DETAILED DESCRIPTION OF THE INVENTION

Manufacturers utilize conductive defogger formulations to form a circuit grid permanently attached to a rigid substrate which is capable of producing heat when powered by a voltage source. Specific physical and chemical functional properties required of conductor materials for use in heated window circuitry include electrical conductivity, good solderability, adhesion to glass and to decorative enamel, chemical durability and reliability under varying environmental conditions including temperature and humidity. Applications in the area of automotive backlight defoggers further require eye appealing cosmetic appearance characteristics which are important to the consumer. In general, conductor compositions suited for heated window applications include finely divided particles of an inorganic binder and a conductive metal powder dispersed in an organic medium.

A. Inorganic Binder

A key constituent in the formulation is finely divided particles of an inorganic glass frit. The frit is required for bonding sintered metal powders, thus the softening point and viscosity of the frit during firing, as well as its wetting characteristics for the metal powder and the substrate are critical. The particle size of the frit is not narrowly critical and frits useful in the present invention will typically have an average particle size from about 0.5 to 4.5 microns, preferably from about 1 to about 3 microns. The amount of binder will typically be from about 1 to 20% by weight of the conductor composition (excluding the organic medium), preferably about 1 to 10% by weight, and more preferably about 1 to 6% by weight. Wetting of a solid surface by a liquid is defined in a general sense in terms of a contact angle formed between liquid-solid interface and a tangent to the surface of the liquid at the contact point. The smaller the contact angle, the better the wetting that is exhibited and the less glass that is required to completely wet a given surface area of solid. A preferred firing temperature between 580° to 680° C. is desired for a frit or frit mixture formulated as a thick film conductor for heated window applications. The glass viscosity expressed as log (eta) should be less than 4 at 680° C. for a single frit or a volumetrically computing average log (eta) for a frit mixture. The units of glass viscosity used herein are poise. The linear weighted average viscosity can be approximated by computing the summation of the respective products of the log (eta) specific viscosity for the individual frit component referenced to log (eta) at a specified temperature (such as 680° C.) and its volume fraction of total frit in the formulation.

Minimization of stress between a thick-film conductor and a substrate is dependent upon their thermal expansion properties, respective moduli of elasticity and relative thickness. Automotive glass has a thermal coefficient of expansion (TCE) of about $9 \times 10^{-6}$/C. Silver metal, the higher primary constituent of the conductor composition, has a higher TCE ($17.5 \times 10^{-6}$/C) but also has a substantially lower modulus compared to glass. To take advantage of the lower modulus of elasticity of metal compared to glass, it is desirable to use the lowest practical amount of glass binder in the conductor formulation, thereby minimizing the stress at the bonding interface. A glass binder which exhibits excellent wetting properties allows the formulator to minimize the amount of binder needed while maintaining excellent solderability and adhesion.

Prior art conductors for heated automotive windows have been based on lead frits. Eliminating lead from glass compositions to meet current toxicity and environmental concerns limits the options with suitable low softening and flow properties while also meeting wettability, thermal expansion, cosmetic and performance requirements. The current invention deals with the unexpected outstanding performance of a series of glasses based upon the constituents: $Bi_2O_3$, $Al_2O_3$, $SiO_2$, $CaO$, $ZnO$, and $B_2O_3$, all of which meet requirements for low toxicity.

B. Electrically Functional Materials

Metal particles such as gold, silver, platinum, palladium, or mixtures and alloys thereof, can be used in the practice of this invention. The particle size of the metal powder or flake is not by itself narrowly critical from the standpoint of technical effectiveness. However, particle size does affect the sintering characteristics of the metal in that large particles sinter a lower rate than small particles. Blends of powders and/or flakes of differing size can be used to tailor the sintering characteristics of the conductor formulation during firing, as is well known in the art. The metal particles must, however, be of a size appropriate to the method of application, which is usually screen printing. The metal particles should therefore be no larger than 20 microns in size and preferably no larger than 10 microns. The minimum particle size is normally about 0.1 micron.

The preferred metal for conductor compositions suitable for automotive backlight defoggers is silver. Silver particles larger than 1.0 micron impart greater coloring power to the paste. Therefore, it is preferred that the compositions of the invention contain at least 50% wt. silver particles larger than 1.0 micron, The silver will ordinarily be of high purity (99+%). However, less pure materials can be used with due consideration for the electrical requirements of the pattern. The amount of silver in the composition will usually be 50–90% wt. on a paste basis (e.g., including the liquid organic medium), and 60–99% wt after firing.

C. Organic Medium

Finely divided particles of electrically functional material and inorganic binder will ordinarily be dispersed in an organic medium to form a semi-fluid paste which is capable of being printed in a desired circuit pattern. The organic medium can be any suitably inert liquid, nonaqueous inert liquids being preferred, which provides appropriate wettabillty of the solids and the substrate, a relatively stable dispersion of particles in the paste, good printing performance with acceptable screenlife, dried film strength sufficient to withstand rough handling, and good firing properties. Any one of various organic liquids with or without thickening agents, stabilizing agents and/or other common additives can be used. Exemplary of the organic liquids which can be used are alcohols, esters of such alcohols such as the acetates and propionates; terpenes such as pine oil, terpineol and the like; and solutions of resins such as polymethacrylates, polyvinylpyrrolidone or ethyl cellulose in solvents such as pine oil and mono-butyl ether of diethylene glycol monoacetate. The medium can also contain volatile liquids to promote fast setting after printing to the substrate. The organic medium will ordinarily constitute 5–50% wt. of the paste.

A preferred organic medium used herein is based on a combination of a thickener consisting of ethyl cellulose in terpineol (ratio 1 to 9), combined with the monobutyl ether of ethylene glycol monoacetate sold under the tradename butyl Carbitol acetate. The conductive paste compositions are conveniently prepared on a three-roll mill. A preferred viscosity for these compositions is approximately 30–100 Pa.S measured on a Brookfield HBT viscometer using a #5 spindle at 10 rpm and 25° C. The amount of thickener utilized is determined by the final desired formulation viscosity, which, in turn, is determined by the printing requirements of the system.

A sintering inhibitor which facilitates formation of a preferred conductor microstructure during sintering can optionally be employed in the present invention and when present is typically incorporated into the paste prior to rollmilling. Up to 1% of sintering inhibitor may be added to retard the rate of metal densification during the firing cycle so long as the performance properties of the conductor composition are not degraded. Finely dispersed refractory oxides on the surface of the metal particles serve to inhibit sintering and can be obtained by either dispersing the oxide additive in the organic medium or, preferably, by adding a metal resinate which decomposes during firing to form a finely dispersed refractory oxide in situ. Preferred sintering inhibitors for the conductive metal are oxides of rhodium (Rh) and ruthenium (Ru) and those rhodium- and ruthenium-based compounds which, under the firing conditions to which they are subjected, are changed to the oxides of the metals. Such materials can be in either particulate form or in the form of organometallic compounds which are soluble in the organic medium. For example, suitable Ru-based materials include Ru metal, $RuO_2$, Ru-based pyrochlore compounds such as bismuth lead ruthenate, and copper bismuth ruthenate, Ru resinates and mixtures thereof. Suitable Rh-containing materials include Rh metal, $RhO_2$, $Rh_2O_3$, Rh resinares and mixtures thereof. Especially preferred sintering additive materials for use in the invention are $RuO_2$, copper bismuth ruthenate and Rh resinate. Nevertheless, it should be recognized that the inhibitors can also be present in the form of a coating on the conductive metal particles. Such coatings can be produced by dispersing the conductive metal particles in a solution of a resinate of the metal of the sintering inhibitor, removing the bulk of the liquid from the dispersion and then drying the particles to form an oxide coating. Alternatively, a thin layer of refractory metal oxide can be coated onto the finely-divided metal powder as described in U.S. Pat. No. 5,126,915 to inhibit premature sintering of the metal powder prior to dissolution of the refractory oxide by the glass frit component. Additional optional ingredients well known to those skilled in the art include surfactants, thickeners and flow agents to adjust paste rheology; up to 5 wt. % pigment to enhance color without degrading resistivity, solderability or adhesion; colorants including those taught by Eustice in U.S. Pat. No. 4,446,059; and frits and/or metal oxides which during firing oxidize silver to silver oxide that diffuses In the adjacent window glass and subsequently precipitates as an attractive stain visible through the glass.

Test Procedures

1. Thermal Expansion/Dilatometric Deformation Point

Rectangular sample bars are prepared by bidirectionally pressing glass frit in a tool steel die. The pressed samples are then fired at a temperature sufficient to completely densify the bar. The cooled sample is placed into an Anter Model 1121 dilatometer (Anter Laboratories, Inc., Pittsburgh, Pa.) and the thermal expansion behavior is measured as a function of temperature up to the temperature of sample deformation, i.e, the temperature where the sample expansion peaks and and contraction begins (due to glass flow). This dilatometric deformation temperature approximately corresponds to a glass viscosity of log (eta)=13 to 14.

2. Glass Viscosity

The method of viscosity determination fox individual frit components may be performed by the use of the parallel plate method on bulk glass samples. The measurements are commercially available from Corning CELS Laboratory Services (Corning, N.Y.).

The viscosity measurements in this case involve the use of the parallel plate method which was originally proposed by G. J. Dienes and H. F. Klemm (J. Appl. Phys., 17 (6), p. 458, 1946). In this method, a pellet-shaped glass sample is put under stress between two parallel and contacting plates. The glass sample completely fills the space between the ceramic platens at all times. The rate at which the platens approach one another is measured during the slow heating said loading of the sample. The viscosity is calculated uslng the following equation:

$$eta=-(2\ h^3M\ g)/(3\pi a^4\ (dh/dt))$$

where eta=viscosity (poise)

h=distance between platens (meters)

M=mass (kilograms)

g=gravitational acceleration (9.80 meters/sec^2)

a=radius of platens (meters)

t=time (seconds)

Samples typically used are made 6 mm in diameter and 1 mm thick. Ceramic rods 6.35 mm in diameter, 4–7 mm in length with fiat ground faces on the ends are used as contact platens for the glass samples. An external metal jig is used to support the rods without restricting vertical movement. Samples are inserted between the platens in a furnace while temperature and weight loading may be changed to measure the effect on deformation rate.

The valid measurement range of this technique is log (eta) from 5 to 10, however, data derived from this measurement may be exponential curve fit to extrapolate to somewhat higher or lower values. Measurements can be verified by the Beam Bending Method described by H. E. Hagy (J. Am. Cer. Soc., 46 (2), p. 93, 1963) with agreement within 5°–10° C. for the annealing and strain point, i.e., log (eta)=13.5 and 14.5 respectively. The rotating cylinder method may be used to confirm viscosity extrapolations for values of log (eta)=3 or lower. Fiber softening temperatures obtained by the ASTM fiber elongation method C338-57 correspond to log (eta) of 7.6.

3. Particle Size, Surface Area and Tap Density

Particle size is measured using a Microtrac® Model 7998 Particle Size Analyser with Advanced Computer Control made by Leeds and Northrup (St. Petersburg, Fla.). The surface area is measured using the BET method on a Micrometrics Flowsorb II-2300 Gas Adsorption apparatus. Samples were degassed (using the Desorb 2300A unit) by heating them to an elevated temperature in a stream of dry $N_2$ for a specific period of time suitable for the material tested prior to the gas adsorption measurement. Apparent volume of a powder is measured in a graduated cylinder after tapping to consolidate the powder. Tap density (TD) is calculated by dividing a powder's apparent volume by its corresponding weight.

4. Resistance

The resistance of fired silver conductor traces is measured using a Hewlett Packard 3478A Multimeter. Conductor thickness is measured using a Dektak 3030 surface profilometer. Sheet resistance is calculated in ohms per square by dividing resistance by the number of squares in the printed pattern. This number is 486 mm/0.76 mm=640 squares.

5. Adhesion

Copper clips are soldered by reflowing a 70/27/3 Pb/Sn/Ag solder alloy over the fired silver conductor on 3/16-inch thick glass substrates. Adhesion of the clip to the silver is measured using an Instron Model A2-140 tensile tester. Adhesion values greater than 40 pounds are preferred. Aged adhesion is measured after exposure of the soldered test structure to an 85° C./85% RH environment for a week.

6. Acid Resistance of Conductor Pastes Fired on Substrate

The fired conductor sample is placed in a jar containing about 500 ml of a 4% acetic acid solution such that half of the circuit pattern is submerged in the solution and half remains in the air above the solution. After 1 minute exposure, the sample is removed, rinsed in a stream of deionized water and dried with a paper towel. The sample is visually observed under a high intensity light source which simulates daylight noting any difference in the stained color of silver (by viewing the circuit pattern through the glass substrate) between sample area which had been immersed in acid vs. the area of the sample which had not been immersed. A rating is assigned according to the scale:

5=no difference (acid resistant)

3= mild difference

1= major difference (high contrast)

The sample is again placed in the acid solution with the same half of the circuit pattern immersed in the acid solution for an additional four minutes. The sample is then removed, rinsed in deionized water, dried and tested for acid resistance by scratching the surface using a razor knife. A scratch is begun in the sample area which had not been immersed and continued into the area which had been immersed in acetic acid solution. The acid resistance is rated based on the visual difference in the scratch between the two areas according to the scale:

Rating 5=no difference (acid resistant),

3=mild difference (scratch widened)

1=major difference (material easily removed)

EXAMPLE 1

A series of glass compositions were prepared and tested to illustrate the present invention, as shown in Table 1. Raw materials used to prepare the glass batches were bismuth oxide, $Bi_2O_3$; aluminum oxide, $Al_2O_3$; zinc oxide, ZnO; vitreous silica. $SiO_2$; and boric anhydride, $B_2O_3$. The batch materials were weighed and combined with mixing prior to insertion into the platinum alloy crucible. The crucible containing the batch mixture was inserted into a furnace controlling at 1100° C. Approximately 30 minutes of melting preceded the quenching of the glass. The glass was quenched between contra-rotating metal rollers with a narrow gap (10–25 mil). The glass frit flake was then milled in water in a ball mill to a mean particle size of about three micrometers. After discharging the milled frit slurry from the mill through a U.S. Standard 100 mesh screen, the frit powder was oven-dried at 150° C. Further Sweco milling of Sample D and E was performed to attain frits having a mean particle size of about one micrometer. The milled glass powders were tested for stability (freedom from phase separation, or crystallization). Measurement of thermal expansion properties was performed for each glass.

TABLE 1

|  | A | B | C | D | E |
| --- | --- | --- | --- | --- | --- |
| $Bi_2O_3$ | 75.1 wt % | 75.1 wt % | 73.0 wt % | 72.46 wt % | 69.81 wt % |
| $Al_2O_3$ | 0.9 wt % | 1.8 wt % | 2.0 wt % | 2.02 wt % | 2.13 wt % |
| CaO | 2.5 wt % | 1.0 wt % | 0.5 wt % | 0.5 wt % | 0.53 wt % |
| ZnO | 10.0 wt % | 10.0 wt % | 10.0 wt % | 10.32 wt % | 12.03 wt % |
| $SiO_2$ | 10.0 wt % | 10.0 wt % | 7.0 wt % | 6.75 wt % | 7.11 wt % |
| $B_2O_3$ | 1.5 wt % | 2.1 wt % | 7.5 wt % | 7.95 wt % | 8.38 wt % |
| Dilatometric Deformation Point | 478° C. | 471° C. | 450° C. | 453° C. | 452° C. |
| TCE @ dil. DP (1/C) × $10^6$ | 10.04 | 10.48 | 11.7 | 10.5 | 8.4 |
| TCE @ RT-400° C. (1/C) × $10^6$ | 9.55 | 9.16 | 9.05 | 9.00 | 8.60 |

A commercially available lead-free alkali fluorophosphate glass frit Pemco 2J157 (Miles Co. Baltimore, Md.) was obtained having a dilatometric deformation point of about 380° C. and a thermal coefficient of expansion (TCE) between room temperature and its deformation point of 21 ppm/C. This frit was milled using a fluidized bed jet mill in which the glass particles are impinged upon each other to obtain size reduction and then collected in a cyclone. The resultant jet-milled frit (designated CF#1) had an average particle size of about 3 microns.

EXAMPLE 2

Glass durability was determined by measuring the weight loss of fully dense glass beads upon exposure to an aqueous 4% acetic acid for 15 minutes (Table 2). The glass beads were prepared by sintering about 0.2 to 0.4 gms of frit at a temperature that allowed for complete densification. The durability of the lead-based frits improved with decreasing lead content. LF #1 is a lead cadmium borosilicate frit, LF #2 is a lead bismuth borosilicate frit, and LF #3 is a lead zinc borosilicate. The durability of the glasses of the present invention was unexpected in light of their low silica content.

TABLE 2

| Glass | C | D | E | LF#1 | LF#2 | LF#3 | CF#1 |
|---|---|---|---|---|---|---|---|
| % weight loss | 0.42 | 0.35 | 0.13 | 22.88 | 8.88 | 0.33 | 0.00 |

EXAMPLE 3

Glass viscosity data were obtained for Glass E and CF #1 as presented in Table 3. Using these viscosity data, the temperatures corresponding to log (eta) viscosity of 10, 7.6, 6 and 4 were determined (Table 4.). Based on these data, a glass binder having a softening point [log (eta)=7.61] below 525° C. and a specific viscosity of log (eta) of less than 5 is required to obtain suitable glass flow to enable conductor densification at the firing temperature 610° to 660° C. For conductors having a thermal processing window between 580° to 680° C. the critical viscosity limits are between log (eta)=2 and 4 at a processing temperature of 610° C.

TABLE 3

| | Log (Viscosity) @ Temp. | | | | |
|---|---|---|---|---|---|
| Ident. | 400 C. | 500 C. | 600 C. | 650 C. | 700 C. |
| Glass E | | 8.7 | 4.0 | 2.9 | 2.2 |
| CF#1 | 12.7 | 3.9 | 1.6 | 1.1 | 0.8 |

TABLE 4

| | Temperature (deg C.) @ Viscosity | | | |
|---|---|---|---|---|
| Ident. | 10 | 7.6 | 6 | 4 |
| Glass E | 484 | 516 | 545 | 601 |
| CF#1 | 418 | 440 | 460 | 498 |

Glass frits were then formulated in silver conductor compositions suitable for heated window defogger applications. The conductor formulations including the glass frit, the silver powders, and sintering inhibitor (if present) were mixed into an organic medium of ethyl cellulose in terpineol to wet out the powders and then dispersed by rollmilling. Pastes were adjusted to a suitable printing viscosity, if required. Characteristics of the silver powders used in conductor compositions presented in the following examples are listed in

TABLE 5

| SILVER POWDER CHARACTERISTICS | | | |
|---|---|---|---|
| Sample | Morphology | SA (m2/g) | TD (g/cc) |
| S1 | irregular | 0.2 to 0.4 | 1.5 to 3.0 |
| S2 | irregular | 1.8 to 2.2 | 1.8 to 2.1 |
| S3 | flake | 0.6 to 0.9 | 4.0 to 6.0 |
| S4 | spherical | 0.5 to 0.7 | 4.0 to 5.0 |

The following procedure was used to prepare small scale conductor test circuits for evaluation in the following examples:

1. Decorative enamel paste of either the solvent-based or UV-curable type is screen printed onto a flat glass substrate using a conventional screen, typically 156 or 195 mesh polyester.
2. The printed enamel pattern is dried at 150° C. for 15 minutes or UV cured at 1.2 J/cm$^2$ depending on the type of enamel.
3. The silver paste is screen printed onto either the airside or tinside of a flat glass substrate or onto unfired enamel using a conventional screen, typically 195 mesh polyester. Other meshes such as 156 and 230 mesh can be used with equal success.
4. The silver is fired or the silver said enamel are cofired in a belt furnace set to reach a peak glass surface temperature of 580° to 680° C. and time above 500° C. of 5 minutes.

The utility of a particular conductor composition increases as its processing latitude increases, i.e., the width of its firing window is broadened, the firing window being defined as the varying firing temperatures over which acceptable adhesion performance is obtained. Adhesion values greater than 40 lbs are desired over both the glass substrate and the enamel. Some compositions identified are suitable for use in applications requiring acetic acid resistance.

Examples 4 through 13 illustrate silver conductor formulations based on a single glass frit as presented in Tables 6, 7 & 8.

TABLE 6

| | Example | | | | | | | | | | | |
|---|---|---|---|---|---|---|---|---|---|---|---|---|
| | 4 | | | | 5 | | | | 6 | | | |
| | Ingreds. | | (%) | | Ingreds. | | (%) | | Ingreds. | | (%) | |
| Frit | LF #1 | | 4.0 | | Frit C | | 4.0 | | Frit D | | 4.0 | |
| Silver | Silver I | | 70.0 | | Silver I | | 70.0 | | Silver I | | 70.0 | |
| Properties | | | | | | | | | | | | |
| Peak Firing T (°C.) | 610 | 620 | 630 | 660 | 610 | 620 | 630 | 660 | 610 | 620 | 630 | 660 |
| Adhesion Over Glass (lb) | 57.5 | 54.5 | 52.0 | 54.0 | 47.5 | 49.0 | 71.5 | 67.8 | 49.3 | 59.0 | 68.0 | 82.3 |
| Adhesion Over Enamel (lb) | 67.0 | 66.3 | 61.0 | 43.8 | 65.5 | 64.0 | 35.5 | 26.0 | 73.0 | 73.0 | 50.5 | 24.0 |
| Aged Adhesion Over Glass (lb) | | | 57.3 | | | | 66.5 | | | | 57.3 | |
| Fired Thickness (μm) | 12.3 | 12.4 | 12.1 | 11.6 | 12.2 | 12.5 | 11.8 | 12.3 | 12.8 | 12.9 | 12.8 | 12.3 |
| Electrical Rs (mΩ/sq) | 4.2 | 4.2 | 4.1 | 4.0 | 4.4 | 4.3 | 4.3 | 4.2 | 4.1 | 4.1 | 4.1 | 4.0 |
| Electrical Resistivity (μΩ-cm) | 5.1 | 5.2 | 5.0 | 4.6 | 5.4 | 5.4 | 5.1 | 5.1 | 5.2 | 5.3 | 5.2 | 4.9 |
| Acid Resistance Rating | | | | | | | | | | | | |

TABLE 6-continued

| | | | |
|---|---|---|---|
| 5 = Excellent | | | |
| 1 = Poor | | | |
| 1 minute in acid | 2 | 2 | 3 |
| 5 minutes in acid | | | |

| | Example | | | | | | | |
|---|---|---|---|---|---|---|---|---|
| | 7 | | | | 8 | | | |
| | Ingreds. | | (%) | | Ingreds. | | (%) | |
| | Frit E | | 4.0 | | Frit D | | 4.0 | |
| | Silver I | | 70.0 | | Silver I | | 84.0 | |
| Properties | | | | | | | | |
| Peak Firing T (°C.) | 610 | 620 | 630 | 660 | 610 | 620 | 630 | 660 |
| Adhesion Over Glass (lb) | 51.8 | 75.7 | 88.5 | 59.5 | 50.5 | 52.5 | 66.8 | 49.0 |
| Adhesion Over Enamel (lb) | 64.5 | 68.5 | 55.3 | 30.7 | 86.3 | 96.0 | 93.3 | 97.3 |
| Aged Adhesion Over Glass (lb) | | | 66.3 | | | | 55.0 | |
| Fired Thickness (μm) | 12.9 | 13.0 | 12.8 | 12.3 | 23.3 | 23.3 | 22.7 | 21.6 |
| Electrical Rs (mΩ/sq) | 4.2 | 4.1 | 4.1 | 4.0 | 1.7 | 1.7 | 1.7 | 1.6 |
| Electrical Resistivity (μΩ-cm) | 5.3 | 5.4 | 5.3 | 4.9 | 4.0 | 3.9 | 3.8 | 3.5 |
| Acid Resistance Rating | | | | | | | | |
| 5 = Excellent | | | | | | | | |
| 1 = Poor | | | | | | | | |
| 1 minute in acid | | | 2 | | | | 5 | |
| 5 minutes in acid | | | | | | | | |

Examples 4 through 7 (Table 6) use 4 wt. % of glass frit having an average particle size of 2.5 to 3.0 microns and 70 wt % Silver I, where the silver is a blend of 48% coarse powder (S1) and 22% of submicron powder (S2). Example 4 uses a conventional lead borosilicate frit while examples 5, 6 and 7 use glasses C, D and E, respectively, as illustrated in Table 6.

Example 4 illustrates the wide firing window for a typical conductor composition for heated automotive windows based on a single conventional lead borosilicate frit (LF #1). Examples 5, 6 and 7 based on frits of the present invention which do not contain lead show similar results. Example 7 containing frit E gives comparable or higher adhesion results versus the conventional lead borosilicate frit (Example 4). Note that in each case, the adhesion over enamel is somewhat degraded for the highest firing temperature (660° C.). Acid resistance for examples 4 to 7 is in the low to average range.

Example 8 (Table 6) illustrates the effect of increased silver content on fired properties compared to Example 6 containing the same frit. Example 8 contains 84% Silver I where the silver is a blend of 66% coarse powder (S1) and 18% submicron powder (S2). In addition to decreased sheet resistance, Example 8 showed similar adhesion over glass except at 660° C.; higher adhesion over enamel; a wider firing window over enamel; and increased acid resistance.

TABLE 7

| | Example | | | | | | | | | | | |
|---|---|---|---|---|---|---|---|---|---|---|---|---|
| | 9 | | | 10 | | | 11 | | | 12 | | |
| | Ingreds. | | (%) | Ingreds. | | (%) | Ingreds. | | (%) | Ingreds | | (%) |
| | Frit E | | 4.0 | Frit E | | 4.0 | Frit E | | 4.0 | Frit E | | 8.0 |
| | Silver II | | 74.5 | Silver II | | 74.5 | Silver II | | 74.5 | Silver II | | 74.5 |
| | | | | Rh Res. | | 0.2 | Rh Res. | | 0.4 | Rh Res. | | 0.2 |
| Properties | | | | | | | | | | | | |
| Peak Firing T (°C.) | 580 | 640 | 670 | 580 | 640 | 670 | 580 | 640 | 670 | 580 | 640 | 670 |
| Adhesion Over Glass (lb) | 110.0 | 112.8 | 141.3 | 137.3 | 133.5 | 134.5 | 142.0 | 139.3 | 157.8 | 120.8 | 143.3 | 138.5 |
| Adhesion Over Enamel (lb) | 85.5 | 10.3 | 0 | 42.5 | 120.3 | 17.8 | 40.3 | 135.8 | 71.0 | 44.8 | 25.0 | 4.0 |
| Fired Thickness (μm) | 11.4 | 10.0 | 9.9 | 14.0 | 12.7 | 11.7 | 15.6 | 14.2 | 12.6 | 16.0 | 14.1 | 13.7 |
| Electrical Rs (mΩ/sq) | .8 | 2.5 | 2.4 | 4.0 | 3.4 | 3.1 | 5.1 | 4.2 | 3.7 | 3.2 | 2.8 | 2.5 |
| Electrical Resistivity (μΩ-cm) | 3.2 | 2.5 | 2.4 | 5.5 | 4.3 | 3.6 | 7.9 | 6.0 | 4.7 | 5.1 | 3.9 | 3.4 |
| Acid Resistance Rating | | | | | | | | | | | | |
| 5 = Excellent | | | | | | | | | | | | |
| 1 = Poor | | | | | | | | | | | | |
| 1 minute in acid | 2 | 5 | | 1 | 4.5 | | 1 | 4.5 | | 3.5 | 5 | |
| 5 minutes in acid | 1 | 4 | | 1 | 3.5 | | 1 | 3.5 | | 1 | 5 | |

Examples 9 through 12 (Table 7) illustrate single frit compositions where the frit component has an average particle size of about 1 micron. The silver used in Examples 9 through 12, Silver II, is a combination of 54.5% flake (S3) and 20% submicron powder (S2) which is more easily sintered than Silver I used in Examples 4 to 8 as shown by comparing resistivity of sample 9 (74.5% Silver II) with that of Example 5 (70% Silver I) and Example 8 (84% Silver I).

Examples 9, 10 and 11 (Table 7) illustrate that the addition of the sintering inhibitor rhodium resinate #8866 available from Engelhard (East Newark, N.J.) decreased the density of the fired conductor using lead-free frit composition E as shown by the increase in electrical resistivity for the series: example 9 (no inhibitor), Example 10 (0.2% rhodium resinate) and Example 11 (0.4% rhodium resinate). The conductor adhesion over enamel was poor for sample 9 (no inhibitor) fired at 640° C. and 670° C., however adhesion over enamel was significantly improved by addition of the sintering inhibitor, thus widening the firing window of the conductor composition.

Increasing the quantity of frit E to 8.0% in Example 12 increased acid resistance with some loss of adhesion over enamel (compare with 4.0% level in Example 10).

Example 13 (Table 8) uses lead-flee alkali fluorophosphate glass frit CF #1 of about 3 microns average particle size obtained by jetmilling commercial Pemco 2,J57 (Miles Co., Baltimore, Md.). Even though this glass has a low dilatometric deformation point of about 380° C. (compared to 452° C. for Frit E), its poor wettability results in unacceptable adhesion of the conductor to glass at the low firing temperature (580° C.). The fired sample was not fully acid resistant as shown by the rating after 5 minutes exposure time.

The use of glass frit blends to obtained required performance over a wide processing window are illustrated in Examples 14 to 18 (Table 8). These conductor compositions use Silver II, a blend of flake and submicron silver, or spherical silver (S4) and rhodium resinate as a sintering inhibitor.

Example 14 illustrates a state-of-the art commercial lead-bearing conductor composition for heated automotive windows containing a blend of two lead based frits, a lead-bismuth borosilicate composition designated LF #2 and a lead-zinc borosilicate composition designated LF #3, in

TABLE 8

| | Example | | | | | | | | |
|---|---|---|---|---|---|---|---|---|---|
| | 13 | | | 14 (Pb bearing) | | | 15 | | |
| | Ingreds. | (%) | | Ingreds. | (%) | | Ingreds. | (%) | |
| | CF #1 | 2.5 | | LF #2 | 2.0 | | Frit E | 2.5 | |
| | Silver II | 74.5 | | LF #3 | 1.0 | | CF#1 | 0.5 | |
| | Rh Res. | 0.2 | | CF #1 | 0.5 | | Silver II | 74.5 | |
| | | | | Silver II | 74.5 | | Rh Res. | 0.2 | |
| | | | | Rh Res. | 0.2 | | | | |
| Properties | | | | | | | | | |
| Peak Firing T (°C.) | 580 | 640 | 670 | 580 | 640 | 670 | 580 | 640 | 670 |
| Adhesion Over Glass (lb) | 0.3 | 55.8 | 62.5 | 77.5 | >100 | >100 | 99.0 | >100 | >100 |
| Adhesion Over Enamel (lb) | 50.8 | 98.5 | >100 | 70.5 | >100 | 96.0 | 87.3 | >100 | >55.0 |
| Fired Thickness (μm) | 16.6 | 13.1 | 13.1 | 13.4 | 14.3 | 13.5 | 13.1 | 12.1 | 10.7 |
| Electrical Rs (mΩ/sq) | 4.9 | 4.0 | 4.2 | 4.2 | 2.9 | 2.6 | 4.3 | 3.5 | 3.5 |
| Electrical Resistivity (μΩ-cm) | 8.2 | 5.3 | 5.4 | 5.6 | 4.2 | 3.5 | 5.6 | 4.2 | 3.7 |
| Acid Resistance Rating | | | | | | | | | |
| 5 = Excellent | | | | | | | | | |
| 1 = Poor | | | | | | | | | |
| 1 minute in acid | 5 | 5 | | 5 | 5 | | 3 | 5 | |
| 5 minutes in acid | 1 | 1 | | 2 | 5 | | 2 | 5 | |

| | Example | | | | | | | | |
|---|---|---|---|---|---|---|---|---|---|
| | 16 | | | 17 | | | 18 | | |
| | Ingreds. | (%) | | Ingreds. | (%) | | Ingreds. | (%) | |
| | Frit E | 2.5 | | Frit E | 2.5 | | Frit E | 8.0 | |
| | CF #1 | 1.0 | | CF #1 | 1.0 | | CF #1 | 1.0 | |
| | Silver II | 75.0 | | S4 | 74.0 | | Silver II | 74.5 | |
| | Rh Res. | 0.2 | | Rh Res. | 0.2 | | Rh Res. | 0.2 | |
| Properties | | | | | | | | | |
| Peak Firing T (°C.) | 580 | 640 | 670 | 580 | 640 | 670 | 580 | 640 | 670 |
| Adhesion Over Glass (lb) | 99.5 | 99.8 | 89.8 | 124.0 | 158.3 | 133.5 | 131.0 | 109.0 | 110.0 |
| Adhesion Over Enamel (lb) | 84.3 | 98.5 | >100 | 100.7 | 113.0 | 141.5 | 80.0 | 63.5 | 30.3 |
| Fired Thickness (μm) | 13.7 | 11.3 | 10.1 | 14 | 13.7 | 12.2 | 16.7 | 14.8 | 13.7 |
| Electrical Rs (mΩ/sq) | 3.8 | 3.4 | 3.3 | 5.6 | 4.0 | 3.7 | 3.4 | 2.9 | 2.7 |
| Electrical Resistivity (μΩ-cm) | 5.2 | 3.9 | 3.3 | 8.3 | 5.5 | 4.5 | 5.6 | 4.2 | 3.2 |
| Acid Resistance Rating | | | | | | | | | |
| 5 = Excellent | | | | | | | | | |
| 1 = Poor | | | | | | | | | |
| 1 minute in acid | 4.5 | 5 | | 5 | 5 | | 5 | 5 | |
| 5 minutes in acid | 3.5 | 5 | | 2 | 5 | | 4.5 | 5 | | addition to CF #1, the alkali fluorophosphate frit. Improvements in both acetic acid resistance and process latitude were obtained by using multiple frits in Example 14 compared to Example 4 containing a single frit.

Examples 15 to 18 (Table 8) illustrate blends of lead-free composition E with 1 micrometer average particle size with CF #1, the jet-milled commercial alkali fluorophosphate frit. Blends of lead-free glasses in Examples 15 to 17 provide enhanced properties compared to the conductor examples containing a single frit (Examples 10, 12 and 13). Example 15, 16 and 18 vary the amounts of the frit compositions. Example 17 illustrates the use of a spherical silver (S4). Example 17 uses a water-cleanable organic vehicle based on polyvinylpyrrolidone and monobutyl ether of diethyleneglycol monoacetate. Examples 15, 16 and 17 illustrate the wide processing latitude yielding excellent adhesion over both glass and enamel and improved acid resistance. These lead-free compositions exceed performance of the state-of-the-art lead-base conductor (Example 14).

Practical application of lead-free glass frits has been evaluated in thick film conductor pastes and comparable performance to Pb bearing silver paste was observed. Optimal performance of the present invention was obtained by combining two or more frits, selecting appropriate silver powders and using Rh resinate as a component of the paste.

What is claimed is:
1. A lead-free glass composition having a softening point log (eta)=7.6 poise from 400° C.–650° C., a log (eta) specific viscosity in the range from 2 at 500° C. to 5 at 700° C. and consisting essentially of by weight 68–75% $Bi_2O_3$, 5–15% $SiO_2$, 5–9% $B_2O_3$, 0.8–5% $Al_2O_3$, 0.3–3% CaO, 9–15% ZnO.

* * * * *